US008509993B2

United States Patent
Ryu et al.

(10) Patent No.: US 8,509,993 B2
(45) Date of Patent: Aug. 13, 2013

(54) SYSTEMS AND METHODS FOR CONTROLLING A VEHICLE ALONG A ROAD WITH A ROAD BANK

(75) Inventors: Jihan Ryu, Apex, NC (US); Flavio Nardi, Farmington Hills, MI (US); Kevin A. O'Dea, Ann Arbor, MI (US); Hualin Tan, Novi, MI (US)

(73) Assignee: GM Global Technology Operations, Inc, Detroit, MI (US)

( * ) Notice: Subject to any disclaimer, the term of this patent is extended or adjusted under 35 U.S.C. 154(b) by 463 days.

(21) Appl. No.: 12/762,468

(22) Filed: Apr. 19, 2010

(65) Prior Publication Data

US 2011/0257827 A1 Oct. 20, 2011

(51) Int. Cl.
*B60W 40/06* (2012.01)
*B62D 133/00* (2006.01)
*B60W 40/076* (2012.01)

(52) U.S. Cl.
CPC .......... *B60W 40/076* (2013.01); *B60T 2210/22* (2013.01); *B60W 2550/142* (2013.01)
USPC .......................................................... 701/41

(58) Field of Classification Search
USPC .......................................................... 701/29
See application file for complete search history.

(56) References Cited

U.S. PATENT DOCUMENTS

| 5,631,529 A | 5/1997 | Shimizu et al. |
| 5,945,799 A | 8/1999 | Shimizu |
| 6,154,695 A | 11/2000 | Shimizu et al. |
| 6,351,694 B1 * | 2/2002 | Tseng et al. ...................... 701/1 |
| 6,374,172 B1 * | 4/2002 | Yamaguchi et al. ............ 701/90 |
| 6,427,130 B1 * | 7/2002 | Mergenthaler et al. ........ 702/142 |
| 6,898,966 B2 * | 5/2005 | Ono et al. ........................ 73/146 |
| 2002/0198655 A1 * | 12/2002 | Bevly et al. .................... 701/213 |
| 2007/0282499 A1 | 12/2007 | Maeda et al. |
| 2008/0201038 A1 * | 8/2008 | Jung et al. ....................... 701/41 |
| 2010/0214164 A1 * | 8/2010 | Nardi et al. .............. 342/357.09 |
| 2011/0112739 A1 * | 5/2011 | O'Dea et al. .................... 701/70 |

FOREIGN PATENT DOCUMENTS

JP 09311042 A * 12/1997
JP 2001108701 A * 4/2001

* cited by examiner

*Primary Examiner* — Shelley Chen
(74) *Attorney, Agent, or Firm* — Parks IP Law LLC

(57) ABSTRACT

Systems and methods for detecting road bank and determining road bank angle include determining a road bank angle as a function of difference in slip angle where the difference in slip angle is a function of difference in course angle and difference in yaw angle.

20 Claims, 2 Drawing Sheets

SYSTEMS AND METHODS FOR CONTROLLING A VEHICLE ALONG A ROAD WITH A ROAD BANK

TECHNICAL FIELD

This disclosure relates generally to systems and methods for controlling a vehicle and, more specifically, to systems and methods associated with road bank detection and road bank angle estimation.

BACKGROUND

Knowing the road bank angle is advantageous for effectively controlling vehicle systems for maneuvers on, for example, ice and snow. However, it is difficult to robustly determine road bank angle so that a vehicle can be effectively controlled along a road with a road bank. Previous systems can incorrectly identify a road bank (false positive), fail to correctly identify a road bank (false negative), and fail to effectively estimate road bank angle. One problem is that accelerometer measurements are affected by road bank and do not represent the actual lateral acceleration of the vehicle, which contributes to false positives and false negatives.

SUMMARY

The various embodiments of the present disclosure provide systems and methods for detecting road bank and determining the associated road bank angle. According to an exemplary embodiment, a system for controlling a vehicle includes a mapping sensor configured to measure course angle along a road, a yaw rate sensor configured to measure yaw rate of the vehicle, a processor, and a memory including computer-executable instructions. The computer-executable instructions, when executed by the processor, cause the processor to determine a road bank angle as a function of difference in slip angle. The slip angle difference is a function of difference in course angle and difference in yaw angle and the yaw angle difference is a function of yaw rate.

According to another exemplary embodiment, a system for controlling a vehicle includes a mapping sensor configured to measure course angle along a road, a yaw rate sensor configured to measure yaw rate of the vehicle, an accelerometer configured to measure lateral acceleration of the vehicle, a speedometer configured to measure longitudinal speed of the vehicle, a processor, and a memory including computer-executable instructions. The computer executable instructions, when executed by the processor, cause the processor to determine a first difference in slip angle as a function of difference in heading and difference in yaw angle, determine a second difference in slip angle as a function of lateral acceleration, yaw rate, and longitudinal speed, and detect a road bank as a function of the first slip angle difference and the second slip angle difference. The yaw angle difference is a function of yaw rate.

According to another exemplary embodiment, a computer-readable medium includes computer-executable instructions for controlling a vehicle. The computer-executable instructions, when executed by a processor, cause the processor to determine a road bank angle as a function of difference in slip angle. The difference in slip angle is a function of difference in course angle and difference in yaw angle. The course angle difference is a function of a course angle along a road measured by a mapping sensor and the yaw angle difference is a function of yaw rate of the vehicle measured by a yaw rate sensor.

The foregoing has broadly outlined some of the aspects and features of the present disclosure, which should be construed to be merely illustrative of various potential applications. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

DETAILED DESCRIPTION

As required, detailed embodiments are disclosed herein. It must be understood that the disclosed embodiments are merely exemplary of the disclosure that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
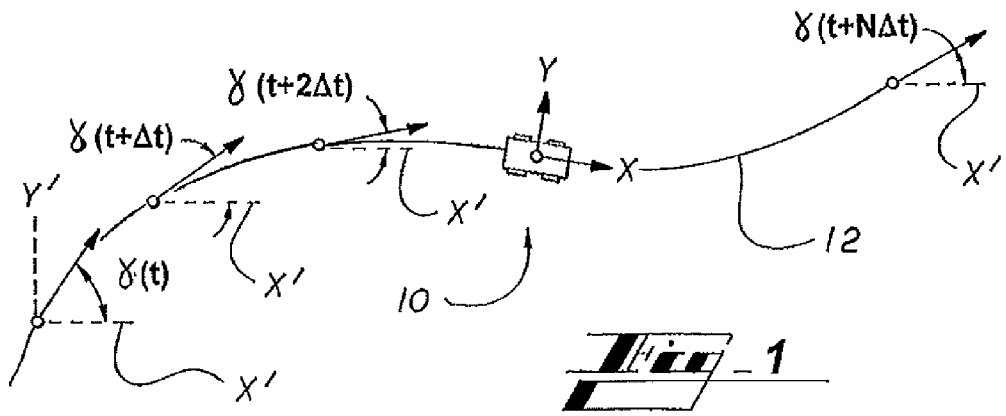
FIGS. 1 and 2 are plan views of a vehicle traveling along a road.
Figure 2:
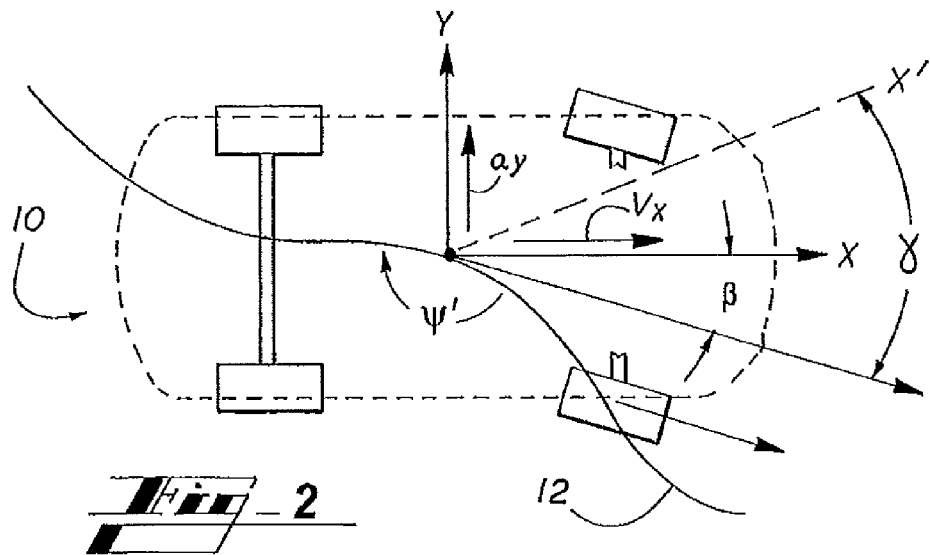
Figure 3:
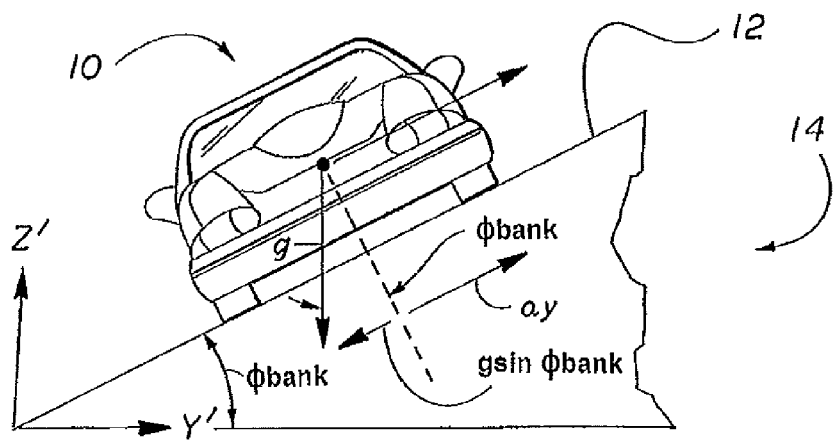
FIG. 3 is an end elevation view of the vehicle of FIG. 1 on a road bank of the road.

Referring to FIGS. 1-3, a vehicle 10 travels along a road 12 that includes a road bank 14. The road 12 has a curvature that is represented by a course angle γ and the incline of the road bank 14 is represented by a road bank angle $\phi_{bank}$. For purposes of teaching, a first coordinate system (x, y, z) is fixed to the vehicle 10. The x-direction represents the longitudinal direction of the vehicle 10 and the y-direction represents the lateral direction of the vehicle 10. A second coordinate system (x', y', z') is fixed to the environment. In FIG. 1, the course angle γ is measured relative to the x' direction.

Figure 4:
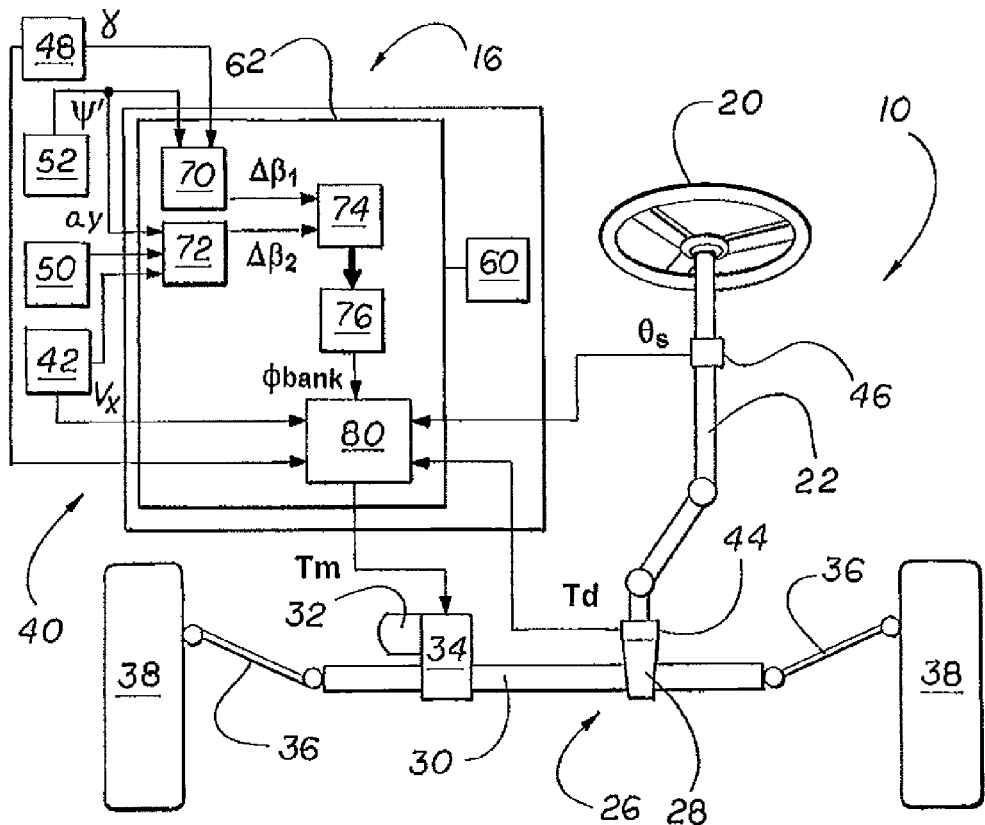
FIG. 4 is a schematic view of the vehicle of FIG. 1 illustrating a vehicle control system.

Referring to FIG. 4, the vehicle 10 includes a steering system 16 including a steering wheel 20, a steering shaft 22, a rack-and-pinion 26 including a first pinion gear 28 and a toothed rack 30, a motor 32 that drives a second pinion 34 that is coupled to the rack 30, tie rods 36, and wheels 38. The steering wheel 20 is connected to the steering shaft 22, which is connected to the first pinion gear 28 such that rotary motion of the steering wheel 20 is transferred to the first pinion gear 28. The first pinion gear 28 converts the rotary motion into linear movement of the rack 30. The tie rods 36 connect the rack 30 to the wheels 38 and convert the movement of the rack 30 into rotation of the wheels 38.

The vehicle 10 further includes a vehicle control system 40 that is configured to control the movement of the vehicle 10 along the road 12. Generally, the vehicle control system 40 includes sensors and applications for determining vehicle and environmental conditions and controlling the vehicle 10 according to the conditions. To control the vehicle 10, the vehicle control system 40 includes or is configured to control or interface with stability control systems such as active front steering (AFS) systems, braking systems, traction control systems, electronic stability control (ESC) systems, drive systems, electronic power steering systems (EPS), combinations thereof, and the like. For example, the illustrated vehicle control system 40 is configured to control the motor 32, which controls the steering angle of the wheels 38.

The sensors include a speedometer 42 configured to measure the longitudinal speed $V_x$ of the vehicle 10, a steering shaft torque sensor 44 configured to measure a driver torque $T_d$ applied to the steering wheel 20, a steering angle sensor 46 configured to measure the steering angle $\theta_s$ of the steering wheel 20, a mapping sensor such as a global positioning system (GPS) sensor 48 configured to measure the course angle $\gamma$, an accelerometer 50 configured to measure the lateral acceleration $a_y$ of the vehicle 10, and a yaw rate sensor 52 configured to measure the yaw rate $\psi'$ of the vehicle 10.

The vehicle control system 40 includes a processor 60 and memory 62 including computer executable instructions. While the methods described herein may, at times, be described in a general context of computer-executable instructions, the methods of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

Computer readable media includes, for example, volatile media, non-volatile media, removable media, and non-removable media. The term computer-readable media and variants thereof, as used in the specification and claims, refer to storage media. In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The memory 62 includes a first slip angle difference application 70, a second slip angle difference application 72, a detection application 74 for detecting road bank 14, and a road bank angle application 76 for determining the road bank angle $\phi$bank of road bank 14. The first slip angle difference application 70 includes computer executable instructions for determining a first slip angle difference $\Delta\beta_1$ as a function of course angle difference $\Delta\gamma$ and yaw angle difference $\Delta\psi$. For purposes of teaching, the sensors 48, 52 take measurements at time increments $\Delta t$. Continuous measurements are digitized with a sampling rate $\Delta t$ or processed with respect to times separated by $\Delta t$ such as a first sample time t and a second sample time t+$\Delta t$. The first slip angle difference $\Delta\beta_1$ is given as:

$$\Delta\beta_1 = \Delta\gamma - \Delta\psi.$$

The course angle difference $\Delta\gamma$ is the difference between course angles $\gamma$ measured by the GPS sensor 48 at consecutive sample times t, t+$\Delta t$ and is given as:

$$\Delta\gamma = \gamma(t+\Delta t) - \gamma(t).$$

The yaw angle difference $\Delta\psi$ is the integral of the yaw rate $\psi'$ measured by the yaw rate sensor 52 from the first sample time t to the second sample time t+$\Delta t$ and is given as:

$$\Delta\psi = \int_t^{t+\Delta t} \psi' \, dt.$$

The second slip angle difference application 72 includes computer executable instructions for determining a second slip angle difference $\Delta\beta_2$ as a function of lateral acceleration $a_y$, yaw rate $\psi'$, longitudinal speed $V_x$, and road bank angle $\phi_{bank}$. The second slip angle difference $\Delta\beta 2$ is given as:

$$\Delta\beta_2 = \int_t^{t+\Delta t} \frac{a_y - \psi' v_x}{v_x} dt - \int_t^{t+\Delta t} \frac{g \sin\phi_{bank}}{v_x} dt.$$

The second slip angle difference $\Delta\beta_2$ is determined by integrating the rate of change of slip angle $\beta$ that is given by:

$$\beta' = \frac{a_y - g\sin\phi_{bank} - \psi' v_x}{v_x}.$$

The lateral acceleration $a_y$ is measured by the accelerometer 50, the yaw rate $\psi'$ is measured by the yaw rate sensor 52, and the longitudinal speed $V_x$ is measured by the speedometer 42. In the formulation of second slip angle difference $\Delta\beta_2$ above, the first expression that is a function of lateral acceleration $a_y$, yaw rate $\psi'$, and longitudinal speed $V_x$ represents the part of the second slip angle difference $\Delta\beta_2$ that is determined by the vehicle control system 40. The second expression that is a function gravity g, road bank angle $\phi_{bank}$, and longitudinal speed $V_x$ represents a correction to the first expression. The correction is to the lateral acceleration $a_y$ measured by the accelerometer 50 since it is affected by road bank 14. With the correction, the actual lateral acceleration of the vehicle 10 is accounted for in the formulation of second slip angle difference $\Delta\beta_2$.

Figures 5, 6, 7:
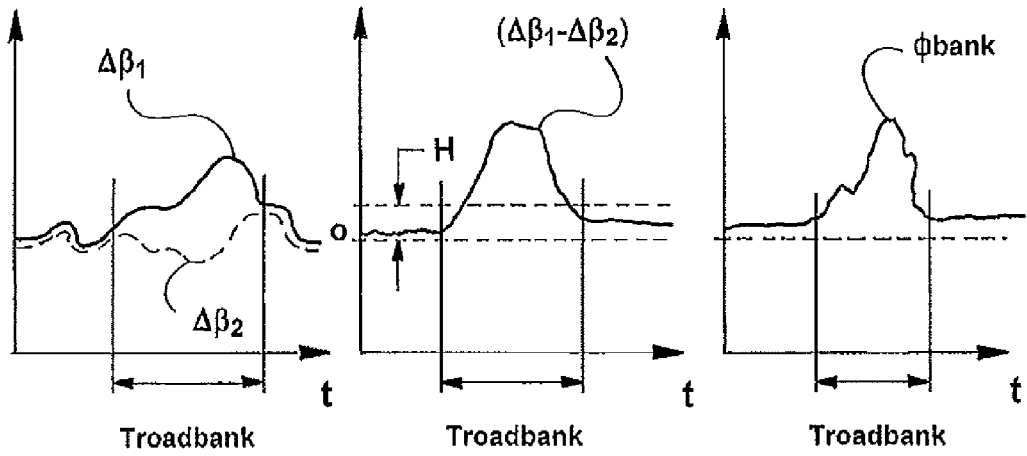
FIG. 5 is a graphical illustration of first slip angle difference and second slip angle difference.
FIG. 6 is a graphical illustration of difference in first slip angle difference and second slip angle difference.
FIG. 7 is a graphical illustration of road bank angle.

Referring to FIGS. 5 and 6, the detection application 74 includes computer executable instructions for comparing the first slip angle difference $\Delta\beta_1$ and the second slip angle difference $\Delta\beta_2$ to detect road bank 14. For purposes of comparison, the road bank angle $\phi_{bank}$ is set to zero to calculate the second slip angle difference $\Delta\beta_2$. As such, the calculated second slip angle difference $\Delta\beta_2$ represented in FIGS. 5 and 6 is uncorrected by the second expression. Each of the other variables is measured as described above.

For purposes of teaching, the first slip angle difference $\Delta\beta_1$ and the second slip angle difference $\Delta\beta_2$ are illustrated in FIG. 5 and the difference between the first slip angle difference $\Delta\beta_1$ and the second slip angle difference $\Delta\beta_2$ is illustrated in FIG. 6. Each is illustrated for time t that includes a time period $T_{roadbank}$ during which the vehicle 10 encounters the road bank 14. When there is no road bank 14 (outside the time period $T_{roadbank}$), the second slip angle difference $\Delta\beta_2$ does not need to be corrected, the first slip angle difference $\Delta\beta_1$ and the second slip angle difference $\Delta\beta_2$ are substantially the same, and the difference between the first slip angle difference $\Delta\beta_1$ and the second slip angle difference $\Delta\beta_2$ is substantially zero. Referring to FIG. 6, if the difference between the first slip angle difference $\Delta\beta_1$ and the second slip angle difference $\Delta\beta_2$ does not exceed a pre-determined threshold H, the detection application 74 detects no road bank. For example, the threshold H can be determined experimentally or theoretically such that errors in sensor measurements do not inadvertently break the threshold H.

When vehicle 10 encounters road bank 14 (inside the time period $T_{roadbank}$), the second slip angle difference $\Delta\beta_2$ does not correct for road bank angle $\phi_{bank}$ and deviates from the first slip angle difference $\Delta\beta_1$, which is unaffected by road bank 14. Thus, deviation can be attributed to the road bank 14. If the difference between the first slip angle difference $\Delta\beta_1$ and the second slip angle difference $\Delta\beta_2$ exceeds the pre-determined threshold H, road bank 14 is detected by the detection application 74.

Referring to FIG. 7, if road bank 14 is detected, the road bank angle application 76 combines the equations for the first slip angle difference $\Delta\beta_1$ and the second slip angle difference $\Delta\beta_2$ to get an equation to solve for road bank angle $\phi_{bank}$ bank that is given as:

$$\bar{\phi}_{bank} = \sin^{-1}\left(\bar{v}_x \frac{\int_t^{t+\Delta t} \frac{a_y - \psi' v_x}{v_x} dt - \Delta\beta 1}{g\Delta t}\right)$$

$$= \sin^{-1}\left(\bar{v}_x \frac{\int_t^{t+\Delta t} \frac{a_y - \psi' v_x}{v_x} dt - \Delta\gamma + \Delta\psi}{g\Delta t}\right)$$

where variables with a line above them represent average values. First slip angle difference $\Delta\beta_1$ is robust since the measurements of the GPS sensor 48 and the yaw rate sensor 52 are not affected by road bank 14.

FIG. 7 is a graphical illustration of the vehicle 10 during the same time t illustrated in FIGS. 5 and 6. Outside the time period $T_{roadbank}$, the road bank angle $\phi_{bank}$ is substantially zero, and inside the time period $T_{roadbank}$, the road bank angle $\phi_{bank}$ is substantially that of the road bank 14. The calculation of road bank angle $\phi_{bank}$ can be used as above for detecting road bank 14.

The road bank angle $\phi_{bank}$ is used by the vehicle control system 40 to better control the vehicle 10 along the road 12. In general, the road bank angle $\phi_{bank}$ is used to inhibit a control action or to compensate estimated signals and measured signals. For example, inhibiting an action is relevant to stability control since stability control can become active on a road bank when it isn't needed. Knowing that the vehicle 10 is on a bank is used to prevent such stability control activation. Signals that are compensated include driver input steering signals. The illustrated vehicle control system 40 includes an automatic control application 80 that determines a motor torque $T_m$ and generates a corresponding drive signal that drives the motor 32 to apply the appropriate torque to the second pinion 34. Here, the motor torque $T_m$ is a function of the road bank angle $\phi_{bank}$ as well as vehicle speed $V_x$ and steering angle $\theta_s$.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system for controlling a vehicle, comprising:
a mapping sensor configured to measure course angle along a road;
a yaw rate sensor configured to measure yaw rate of the vehicle;
a processor; and
a memory comprising computer-executable instructions that, when executed by the processor, cause the processor to:
calculate a difference in slip angle, including:
calculating a difference in course angle based on course angles measured by the mapping sensor;
calculating a difference in yaw angle based on yaw rate measured by the yaw rate sensor; and
calculating the difference in slip angle as a difference between:
the difference in course angle; and
the difference in yaw angle; and
calculate a road bank angle based on the difference in slip angle.

2. The system of claim 1, each of the course angle difference and the yaw angle difference being a function of a sampling rate.

3. The system of claim 1, further comprising an accelerometer configured to measure lateral acceleration of the vehicle, wherein calculating the road bank angle is based further on a lateral acceleration measured by the accelerometer.

4. The system of claim 1, further comprising a speedometer configured to measure longitudinal speed of the vehicle, wherein calculating the road bank angle is based further on a longitudinal speed measured by the speedometer.

5. The system of claim 1, the computer-executable instructions further causing the processor to detect a road bank based on the road bank angle.

6. The system of claim 5, the computer-executable instructions further causing the processor to compare the road bank angle to a threshold to detect the road bank.

7. The system of claim 1, wherein calculating the road bank angle is based further on $$\bar{\phi}_{bank} = \sin^{-1}\left(\bar{v}_x \frac{\int_t^{t+\Delta t} \frac{a_y - \dot{\psi} v_x}{v_x} dt - \Delta\beta}{g\Delta t}\right)$$

where $\phi_{bank}$ is the road bank angle, $V_x$ is longitudinal speed, $a_y$ is lateral acceleration, $\psi'$ is yaw rate, $\Delta\beta$ is slip angle difference, and g is gravitational acceleration.

8. The system of claim 7, wherein calculating the slip angle difference is based further on $\Delta\beta = \Delta\gamma - \Delta\psi$ where $\Delta\beta$ is slip angle difference, $\Delta\gamma$ is course angle difference, and $\Delta\psi$ is yaw angle difference.

9. A system for controlling a vehicle, comprising:
a mapping sensor configured to measure course angle along a road;
a yaw rate sensor configured to measure yaw rate of the vehicle;
an accelerometer configured to measure lateral acceleration of the vehicle;
a speedometer configured to measure longitudinal speed of the vehicle;
a processor; and a memory comprising computer-executable instructions that, when executed by the processor, cause the processor to:
  calculate a first difference in slip angle, including:
    calculating a difference in course angle based on course angles measured by the mapping sensor;
    calculating a difference in yaw angle based on yaw rate measured by the yaw rate sensor;
    calculating the first difference in slip angle as the difference between:
      the difference in course and
      the difference in yaw angle;
  calculate a second difference in slip angle based on:
    lateral acceleration measured by the accelerometer;
    yaw rate measured by the yaw rate sensor; and
    longitudinal speed measured by the speedometer; and
  detect a road bank based on the first slip angle difference and the second slip angle difference.

10. The system of claim 9, the computer-executable instructions further causing the processor to compare the difference between the first slip angle difference and the second slip angle difference to a threshold to detect road bank.

11. A non-transitory computer-readable medium comprising computer-executable instructions for controlling a vehicle, the computer-executable instructions, when executed by a processor, causing the processor to:
  calculate a difference in slip angle, including:
    calculating a difference in course angle based on course angles measured by a mapping sensor;
    calculating a difference in yaw angle based on a yaw rate measured by a yaw rate sensor;
    calculating the difference in slip angle as a difference between:
      the difference in course angle; and
      the difference in yaw angle;
  calculate a road bank angle based on the difference in slip angle.

12. The non-transitory computer-readable medium of claim 11, each of the course angle difference and the in yaw angle difference being a function of sampling rate.

13. The non-transitory computer-readable medium of claim 11, wherein calculating the road bank angle is based further on a lateral acceleration measured by an accelerometer.

14. The non-transitory computer-readable medium of claim 11, wherein calculating the road bank angle is based further on a longitudinal speed measured by a speedometer.

15. The non-transitory computer-readable medium of claim 11, the computer-executable instructions further causing the processor to detect a road bank as based on the road bank angle.

16. The non-transitory computer-readable medium of claim 15, the computer-executable instructions further causing the processor to compare the road bank angle to a threshold to detect the road bank.

17. The non-transitory computer-readable medium of claim 11, wherein calculating the road bank angle is based further on $$\overline{\phi}_{bank} = \sin^{-1}\left(\overline{v}_x \frac{\int_t^{t+\Delta t} \frac{a_y - \dot{\psi}v_x}{v_x} dt - \Delta\beta}{g\Delta t}\right)$$

where $\phi_{bank}$ is the road bank angle, $V_x$ is longitudinal speed, $a_y$ is lateral T is acceleration, $\psi'$ is yaw rate, $\Delta\beta$ is slip angle difference, and g is gravitational acceleration.

18. The computer-readable medium of claim 17, wherein calculating the slip angle difference is based further on $\Delta\beta=\Delta\gamma-\Delta\psi$ where $\Delta\beta$ is slip angle difference, $\Delta\gamma$ is course angle difference, and $\Delta\psi$ is yaw angle difference.

19. The system of claim 1, further comprising:
  an accelerometer configured to measure lateral acceleration of the vehicle, wherein calculating the road bank angle is based further on a lateral acceleration measured by the accelerometer; and
  a speedometer configured to measure longitudinal speed of the vehicle, wherein calculating the road bank angle is based further on a longitudinal speed measured by the speedometer.

20. The non-transitory computer-readable medium of claim 11, wherein calculating the road bank angle is based further on:
  a lateral acceleration measured by an accelerometer; and
  a longitudinal speed measured by a speedometer.

* * * * *